United States Patent [19]

Rosán, Sr. et al.

[11] 4,015,504
[45] Apr. 5, 1977

[54] SELF-BORING FASTENER AND METHODS OF USE THEREOF

[75] Inventors: José Rosán, Sr., San Juan Capistrano; Marvin P. Reece, Dana Point, both of Calif.

[73] Assignee: Rosan Hydraulics Inc., Newport Beach, Calif.

[22] Filed: Apr. 11, 1975

[21] Appl. No.: 567,415

Related U.S. Application Data

[63] Continuation-in-part of Ser. No. 415,978, Nov. 15, 1973, abandoned.

[52] U.S. Cl. .................................. 85/42; 85/41; 151/41.73
[51] Int. Cl.² ........................................ F16B 25/00
[58] Field of Search .............. 85/41, 46, 30, 68, 44, 85/42, 47, 14, 20; 12/147 R; 151/41.73

[56] References Cited

UNITED STATES PATENTS

| 206,078 | 7/1878 | Bowes | 85/47 |
|---|---|---|---|
| 1,349,183 | 8/1920 | Anderson | 85/30 |
| 2,110,948 | 3/1938 | Brandt | 85/41 |
| 2,400,318 | 5/1946 | Rosan | 85/47 |
| 2,664,809 | 1/1954 | Morell | 85/41 |
| 2,742,074 | 4/1956 | Rosan | 85/46 |

FOREIGN PATENTS OR APPLICATIONS

| 1,335,119 | 7/1963 | France | 85/44 |
|---|---|---|---|
| 646,246 | 11/1950 | United Kingdom | 85/14 |
| 846,294 | 8/1960 | United Kingdom | 85/47 |
| 315,182 | 7/1929 | United Kingdom | 85/42 |

*Primary Examiner*—Ramon S. Britts

[57] ABSTRACT

A self-boring fastener comprising an elongated cylindrical element which intersects a driving means, said cylindrical element having a knife edge means axially projecting from the periphery of the extreme end thereof so as to extend beyond said end, and a thin knife edge element continuously, helically positioned about the outer periphery of said cylindrical element, said knife thread extending outwardly laterally from the outer periphery of said cylindrical element, said cylindrical element having an axial hole extending inwardly from the extreme end thereof so as to form an internal cavity in said cylindrical element. The method of fastening rubber, wood and other non-metallic materials either together or to base materials without the necessity of preformed bores or embedded metal mating parts and without incuring the problems of misalignment by use of the self-boring fastener.

19 Claims, 17 Drawing Figures

SELF-BORING FASTENER AND METHODS OF USE THEREOF

CROSS REFERENCE TO RELATED APPLICATIONS

This application is a continuation-in-part of the following:

Inventors: José Rosán, Sr. and Marvin P. Reece;
Title: Self-Boring Fastener and Methods of Use Thereof;
Ser. No. 415,987;
Filed: Nov. 15, 1973, now abandoned.

BACKGROUND OF THE INVENTION

This invention relates to studs and bolts and more particularly to a novel fastener for use in wood, rubber and other non-metallic materials, which requires no preformed bore therefor.

Wood, rubber and other soft or plastic parts are commonly fastened together or to other materials by means of fasteners which require preformed bores either threaded or plain or a combination of such preformed bores and embedded or molded in metal parts to which the fasteners are attached. Examples of such arrangements are the methods used to fasten rubber of other resilient materials as liners to drums, tanks, vats, storage vessels, trucks, chutes or mills, fastening of plastic to metal parts, means used to hold wood and/or wood or metal together in the construction of homes, cabinets, furniture, ships, plywood, concrete forming systems, commercial structures, mobile homes and vehicles.

Some of the methods and inventions used are described in U.S. Pat. Nos: 3,378,209, 3,599,827, 2,687,230, 2,328,728 and 2,058,257.

Screws are used without preboring holes in relatively light load situations but have the disadvantage of being relatively easy to pull out and distorting or destroying the base material because of displaced material buildup, if they are inserted into narrow sections. Split screws or screws with hollow centers have been described to solve these problems but have failed to gain commercial acceptance because of the high cost to produce them or their inability to solve the problems within the parameter of modern production methods. Such articles are described in U.S. Pat. Nos: 1,729,670, 1,368,896 and 126,366.

SUMMARY OF THE INVENTION

The fastener of the present invention consists of an elongated cylindrical shaft which intersects a driving or installation means and the other end thereof provided with a thin knife edge element continuously helically positioned about the outer periphery thereof. The knife thread element extends laterally outwardly from the periphery so as to form a helical thread element having a tapered knife edge characteristic. This knife edge is sufficiently sharp at its crests and the included angle of the thread sufficiently acute so as to cause the thread to penetrate and separate the workpiece material, i.e. wood or rubber by a unique knifing action.

The portion of the cylindrical element about which is provided by the knife edge element has a knife edge means axially projecting from the extreme end thereof. This axially extending knife edge means may be annularly continuous or intermittant.

The portion of the elongated cylindrical element about which is provided the aforesaid knife edge element further has an axial concavity concentrically positioned so that the extreme end of said portion is intersected thereby to form a hollow cup means within the elongated cylindrical portion. Thus as the fastener is driven into the parent material, the axially extending knife edge means and the helical knife edge element slice into the parent material but only in the thread areas. The matrix of the parent material is contained within the hollow cup of the fastener and provides additional support to the fastener when a shear force is applied thereto.

The interface contact of the material matrix contained into aforesaid hollow cup and the inner wall of the concavity of the fastener provides additional "pull-out" characteristics i.e. resists pull-out due to an axial load because of the frictional factors involved. In addition, the interface of the concavity of the fastener and the material matrix encompassed therein is sufficiently tight so that an air pocket is formed between the upper portion of the concavity of the fastener and the original surface so that portion of the matrix material encompassed in the cavity provides an air piston effect.

Of course, because of the nature of the wood and rubber, the compression of the air results in a force being applied to the localized surface of the material matrix encompassed in the fastener concavity. This causes the workpiece material so encompassed to expand laterally thereby multiplying the frictional force and concomittantly increase the resistance to actual pull-out loads as well as vibratory dislocation. An additional compressive force is supplied by the volume of material displaced which is proportionate to the volume of the wall surrounding the hollow portion.

Although the fastener of the instant invention is particularly adaptable for use in rubber material, in the case of wood materials, the thread "knifes" between the wood fibers, in contradistinction to the crushing, swedging, bashing and general breakdown of the wood structure caused by the thread of a conventional fastener. Because of the "knifing"action, the knife thread of the invention does not substantially preload the workpiece material. Therefore, any weakening effect is minor and qualitatively different from the fiber deflection and masceration resulting by the use of conventional fasteners.

It is an object of our invention to provide a novel and improved fastener for use in wood, rubber and other non-metallic materials which requires no preformed bore in the workpiece.

A further object of our invention is a novel and improved fastener for attaching rubber, wood, or other non-metallic materials to base structures which requires that no fastener sub-assemblies be preembedded in the rubber, wood or other non-metallic materials to prevent pull-out or assure rigid attachment.

Another object of our invention is to provide a new and improved method of joining several wood, rubber, or other non-metallic material objects without the expensive tooling or labor costs currently required to prebore holes, preassemble parts and align them.

A further object of our invention is to provide a novel and improved method of attaching rubber or other resilient materials as a liner for metal truck beds, cement handling equipment, chutes, ore handling equipment, rotary ball, tube or rod mills, which is simple, inexpensive and whose use requires minimum time and manipulation by use of the novel fastener of this invention.

Another object of our invention is to provide an unusual and original method for attaching rubber, wood, or other non-metallic materials to base structures, which requires a minimum of inventory of both attached to and attaching parts because of the elimination of the need to mate or align prebored holes by using the invented fastener herein revealed.

Still another object of our invention is to provide a new and unusual method for the replacement of damaged or worn sections of rubber, wood, or other non-metallic materials, used as a lining for support materials, by cutting predetermined sizes of such materials and attaching them with the invented fastener without having to be concerned about prebored holes or alignment thereof through the use of the invented fastener herein disclosed.

The novel features and foregoing objects which are considered as characteristics of this invention are set forth particularly in the appended claims. The improved fastener itself, however, both as to its construction and methods of use, together with additional features and advantages thereof, will be best understood upon perusal of the following detailed description of certain specific embodiments with reference to the accompanying drawings.

DESCRIPTION OF THE PREFERRED EMBODIMENT

Figure 1:
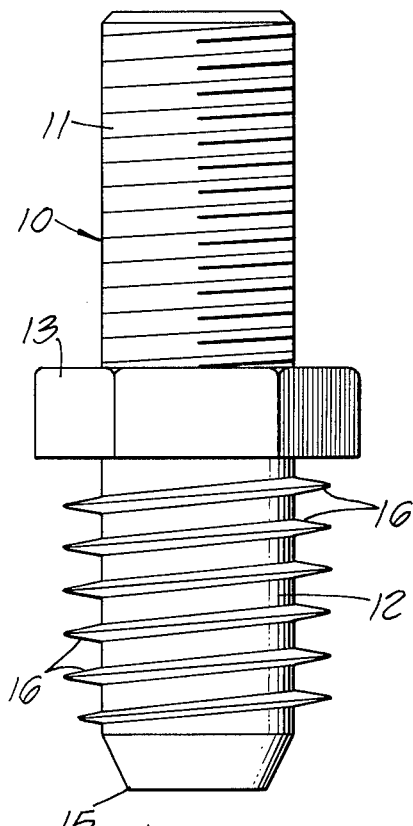
FIG. 1 is an elevational view of the self-boring fastener of the instant invention.
Figure 3:
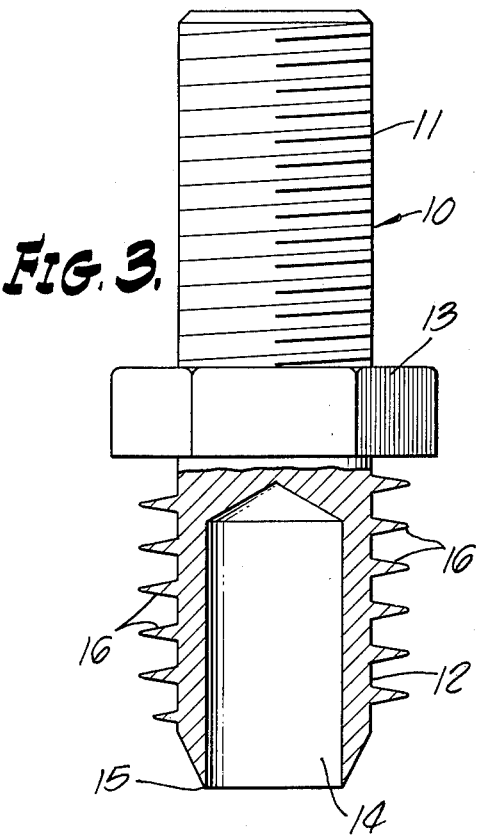
FIG. 3 is an elevational view, partly sectioned, of the fastener shown in FIG. 1.
Figure 2:
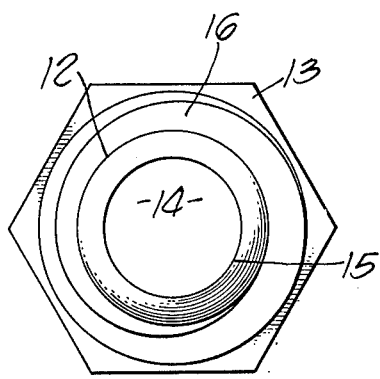
FIG. 2 is a top plan view of the fastener shown in FIG. 1.
Figure 4:
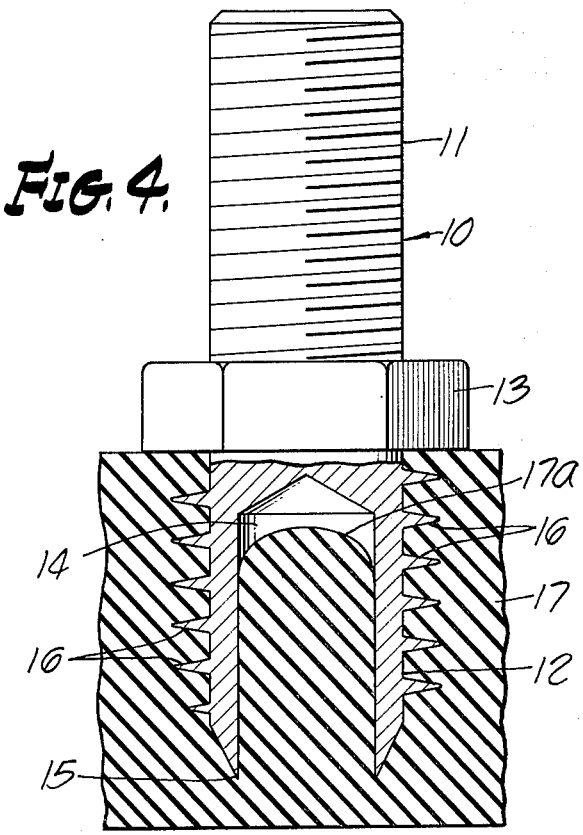
FIG. 4 is an elevational view partly sectioned, of the fastener of FIG. 1, installed in a workpiece material.
Figure 5:
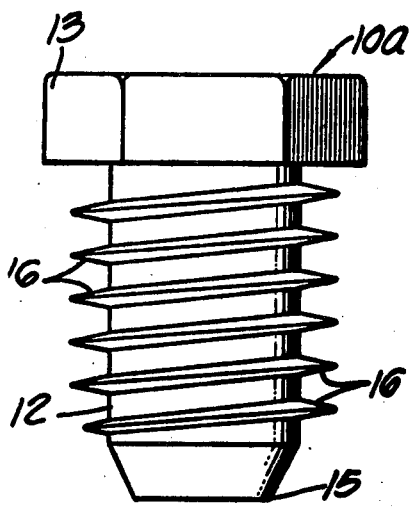
FIG. 5 is an elevational view of an alternate embodiment of the fastener of the invention.
Figure 8:
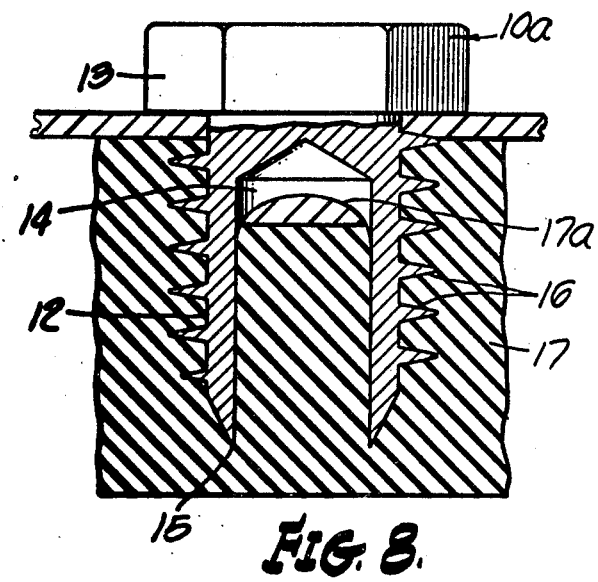
FIG. 8 is an elevational view partly sectioned, of the fastener of FIG. 5, installed in a workpiece material.
Figure 6:
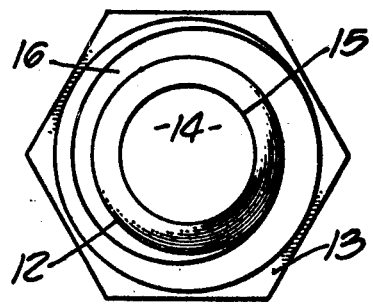
FIG. 6 is a top plan view of the fastener shown in FIG. 5.

In FIGS. 1–4 reference numeral 10 designates the self-boring fastener of the instant invention which is a stud comprised of an elongated members 11 and 12 respectively. Interposed between members 11 and 12 of stud 10 is a driving means 13. It should be noted at this juncture although driving means 13 is shown as a hex drive means, any suitable drive means may be utilized without deviating from the scope of the invention. Elongated member 11 is provided with conventional threads 11a interconnecting with any desired element, i.e. nuts or couplers.

Elongated member 12 is provided with a hollow portion 14 which extends axially from the end of elongated member 12 opposite its intersection with drive means 13 so as to form an actual cuplike hollow which defines a chamber. The extreme forward end of elongated member 12 is formed to provide axially extending knife edge means 15. It is understood that although knife edge means 15 are elongated as being annularly continuous, said knife edge means may be intermittant provided they are disclosed annularly about the forward end of elongated member 12. The purpose and function of knife edge means 15 and hollow portion 14 of elongated member 12 will hereinafter be disclosed in fuller detail.

Laterally and helically superimposed about the outer periphery of elongated member 12 are knife edge means 16 defined by laterally inclined surfaces intersecting each other to form the knife edge thereof. Although knife edge means 16 are illustrated as being a continuous helix, said knife edge means may be intermittantly formed without deviating from the scope of the invention herein.

In FIGS. 5–8 another embodiment of the invention is disclosed wherein the elongated member 11 of the stud is omitted to provide a self-boring bolt 10a. The remaining elements of bolt 10a are the same as and perform similarly to those of stud 10.

Figure 9:
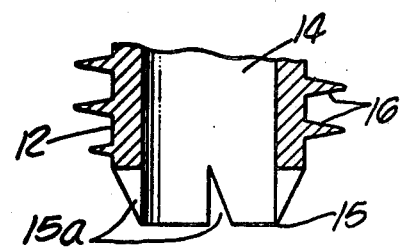
FIG. 9 is a fragmented view of an alternate embodiment of the forward knife edge of the fastener of FIGS. 1–8 provided with vertical cutting grooves.
Figure 7:
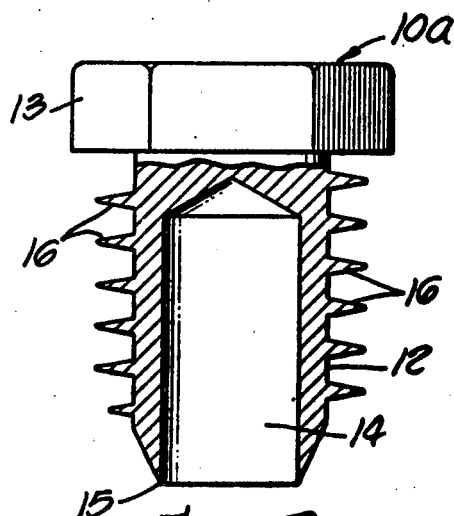
FIG. 7 is an elevational view, partly sectioned, of the fastener shown in FIG. 5.

FIG. 9 illustrates the knife edge means 15 having vertical cutting grooves 15a therethrough for facilitating the penetration of the fastener into hard woods and the like. Although the cutting grooves 15a are shown as "V" cuts, they may be of any configuration consistent with desired design.

Figure 9A:
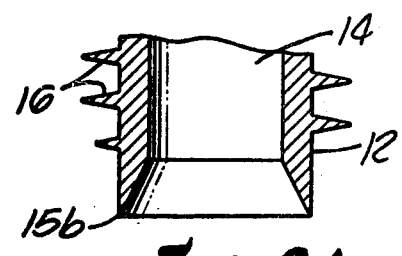
FIG. 9A is a fragmented view of an alternate embodiment of the forward knife edge of the fastener of the invention.

FIG. 9A shows another embodiment of the knife edge means 15. As illustrated knife edge 15b provides the elongated or foremost portion thereof has an inward taper rather than an outward taper as does knife edge 15.

Figure 9B:
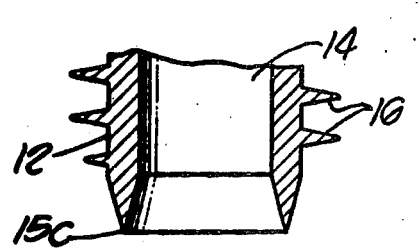
FIG. 9B is a fragmented view of still another alternate embodiment of the forward edge of the fastener of the invention.

FIG. 9B illustrates still another embodiment of the knife edge means 15 wherein knife edge means 15c is provided with an inward and outward taper so that the knife edge protrudes longitudinally from the center of the fastener wall.

Figure 10:
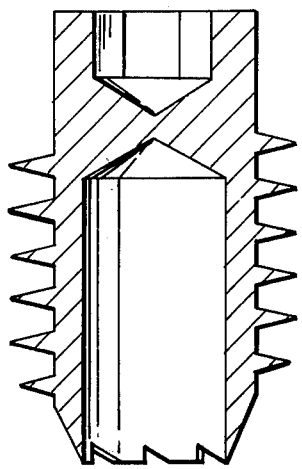
FIG. 10 is an alternate form of the instant invention with an internal driving means on an end.
Figure 15:
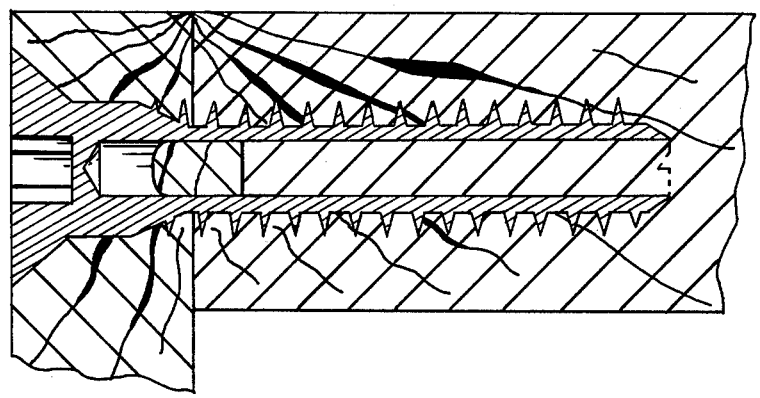
FIG. 15 is a sectioned view of the screw of FIG. 11 used to fasten thin sectioned plywood, wood or plastic together.

FIG. 10 is a cross-sectional view of another embodiment of the invention wherein an internal drive means is used. The remaining elements are similar to FIG. 7.

Figure 11:
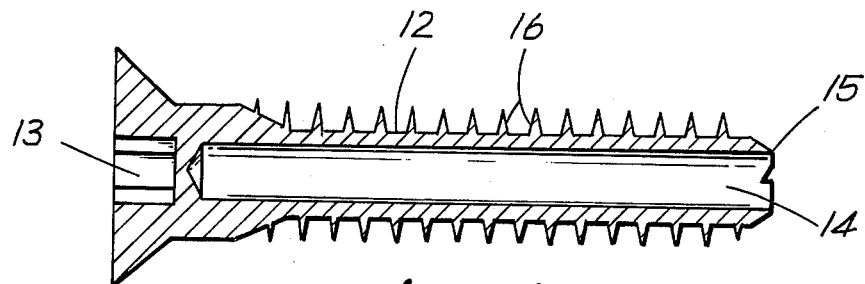
FIG. 11 is a cross-sectional view of a self-boring screw.

FIG. 11 is a cross-sectional view of the instant invention in the embodiment of a wood screw. The details of the invention as described in FIGS. 5–8 except the body 12 is lengthened and narrowed.

Figure 12:
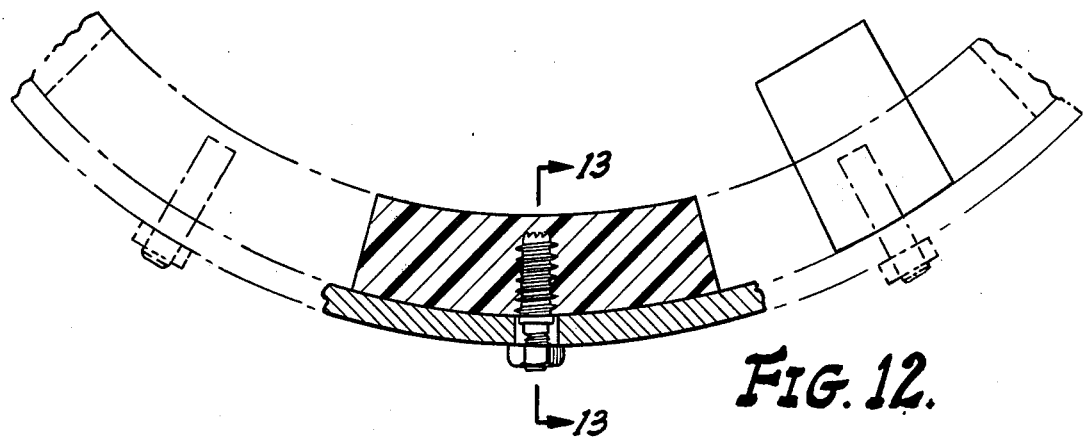
FIG. 12 is a partially sectioned view of the method of holding a non-metallic liner in place on a drum or curved surface using the present invention.

FIG. 12 illustrates a method of fastening a liner of resilient or non-metallic material to a metallic base using the self-boring fastener without the need for pre-drilled holes or embedded mating parts in the liner.

Figure 13:
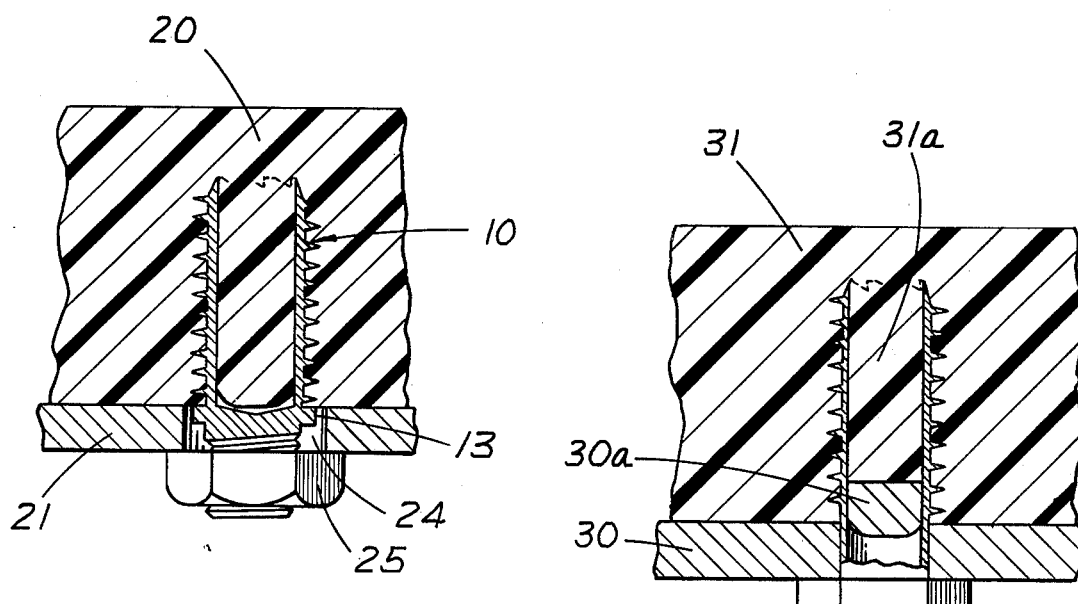
FIG. 13 is a sectioned view illustrating a method of fastening a non-metallic material to a base structure without preboring holes in the non-metallic material.

FIG. 13 is a cross-sectioned view of the stud used in the method illustrated in FIG. 12 showing the fastener 10 in place and projecting through the bore in the base material. Using this method the liner 20 is temporarily positioned against the base 21 and the fastener of the instant invention 10 rotatably embedded therein through prebored holes in the base 24 using driving means 13 in the stud.

After the self-boring fastener is embedded, a nut means 25 is used to permanently position the liner in place. Worn and cut portions of the liner may be replaced by merely cutting out such sections and temporarily positioning new liner material in place; then permanently fastening it using the self-boring fastener.

Figure 14:
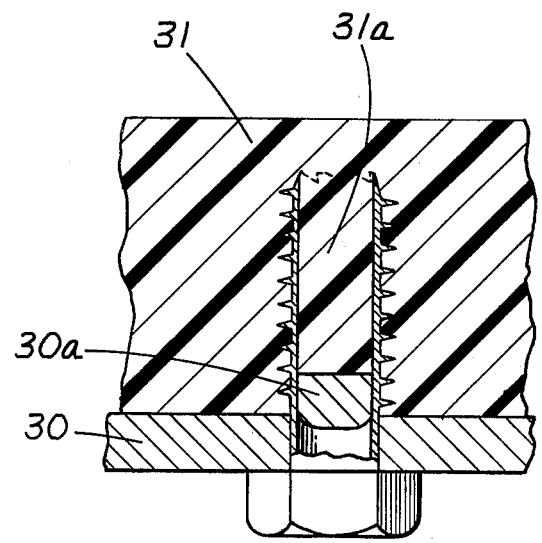
FIG. 14 is a sectioned view of a method of fastening two non-metallic materials using the instant invention.

FIG. 14 is a cross-sectional view of a method of fastening two non-metallic substances together without the use of prebored holes.

The two materials 30 and 31 are temporarily positioned in the desired position. The self-boring fastener in the configuration of FIGS. 5–8 is rotatably embedded through the first material 30 into the second 31. The core sections 30a and 31a of the two respective materials are compressed within the fastener by the compressive effect of the trapped air and the reduction of volume within the chamber greatly enhancing the pullout and shear resistance.

To install the self-boring fastener of the instant invention, the fastener is imposed over the workpiece surface, i.e. rubber, plastic or wood and rotated in a threading motion so that the forward knife edge means 15 will sever the workpiece material 17 in an axial direction. Continued rotation as hereinabove described, i.e. cutting of the workpiece surface in a circular pattern, will allow the lead position of the helical knife edge to "bite" into the workpiece material 17. Continuing the rotational force will cause the helical knife edge to cut itself into the workpiece matrix in a helical pattern into said matrix.

As the fastener is rotated, the helical knife edge severs, parts and works cleanly through the rubber matrix (or in between the wood fibers) forming a tight interface between the workpiece matrix and the knife edge surface.

Thus, the hereinabove described fastener results in very slight pre-loading to the workpiece material 17, particularly in the case of wood where there is no breakdown or rupture of the wood fiber.

During the installation of the fastener and subsequent to its complete installation, an air pocket exists between the original surface 17a of the workpiece material 17 which is now encompassed by the hollow portion 14 and the walls and enclosed portion of the hollow chamber portion. The air contained in said chamber is compressed and provides a force to the surface of the workpiece material 17 contained in hollow portion 14 so as to provide a piston effect. Because of the resistance of the workpiece material the piston effect compresses the workpiece material causing the same to expand laterally thereby providing a high frictional interface between the workpiece matrix contained in the hollow portion and the walls of the hollow portion. This effect is enhanced by the compressive effect of increasing the volume of the displaced workpiece material 17 contained within the hollow chamber portion 14 by approximately ten to fifteen percent which is the volume of the wall 18 surrounding the hollow chamber portion.

As the density of the material increases and its frictional characteristics, the different embodiments of the knife edges FIGS. 9, 9A, 9B, (15a), (15b) and (15c) are used to achieve maximum pull-out and shear resistance. The embodiment shown in FIG. 9A being used in the softest, most easily compressible materials with the least resistance, while the configuration used in FIG. 9 is used in the most dense material with the greatest functional resistance.

The configuration illustrated in FIG. 9B is used with the majority of materials which exhibit average frictional resistance and resistance to compression.

While several of the embodiments of the invention have been described, it is understood that the particular embodiments of the invention herein disclosed are for illustrative purposes only and that various changes may be made therein without departing from the principles of the invention or the scope of the annexed claims.

We claim:

1. A self-boring fastener for installation in a boreless workpiece, comprising in combination;

a workpiece composed of wood, rubber or synthetic plastic materials, and an elongated cylindrical element mounted within said workpiece, said cylindrical element having at least one end thereof provided with an axial cavity so as to form a continuous curcumferential wall member having an opened end and an oppositely disposed closed end wherein a compression chamber is defined by said axial cavity;

said wall member being provided with a longitudinally extending knife edge at the open extremity thereof;

said elongated cylindrical element being provided with a thin knife-edge element helically positioned about the outer periphery of said cylindrical element;

driving means carried by said cylindrical element to rotatably embed the fastener in a workpiece; and a compressed core of workpiece material within said compression chamber.

2. A self-boring fastener for installation in a boreless workpiece as described in claim 1 wherein the thin helical knife-edge element is positioned about the outer periphery of the portion of said cylindrical element which contains the axial cavity.

3. A self-boring fastener for installation in a boreless workpiece as described in claim 2 wherein said thin helical knife-edge element is circumferentially continuous and is defined by laterally inclined surfaces intersecting each other to form said knife-edge thereof.

4. A self-boring fastener for installation in a boreless workpiece as described in claim 3 wherein said driving means is positioned between the ends of the elongated cylindrical element.

5. A self-boring fastener for installation in a boreless workpiece as described in claim 3 wherein said driving means is positioned at one extremety of said cylindrical element.

6. A self-boring fastener for installation in a boreless workpiece as described in claim 4 wherein the elongated cylindrical element is provided with the thin helical knife-edge element on one side of said driving means and the elongated cylindrical element on the other side of said driving means is provided with conventional threads on the exterior thereof.

7. A self-boring fastener for installation in a boreless workpiece as described in claim 3 wherein the cylindrical wall is externally beveled at its extremety so as to taper inwardly and form said longitudinal knife-edge.

8. A self-boring fastener for installation in a boreless workpiece as described in claim 3 wherein the cylindrical wall is internally beveled at its extremety so as to taper outwardly and form said longitudinal knife-edge.

9. A self-boring fastener for installation in a boreless workpiece as described in claim 3 wherein the cylindrical wall is externally and internally beveled so as to converge inwardly and outwardly thereby providing a knife-edge which is concentric with the mean thickness of said wall.

10. A self-boring fastener for installation in a boreless workpiece as described in claim 3 wherein the knife-edge formed is provided with longitudinal V-cuts whereby the trailing side of said V-cut upon the clockwise rotation of the fastener is vertical, and the lead side of said V-cut is slanted with respect to said vertical trailing edge.

11. A self-boring fastener for installation in a boreless workpiece as described in claim 3 wherein said driving means is a hexagonal flange normally extending from said cylindrical element.

12. A self-boring fastener for installation in a boreless workpiece as described in claim 5 wherein said driving means includes tool head means integral with and positioned at one extremity of said cylindrical element.

13. A method of fastening wood, rubber and synthetic plastic materials to each other, without the use of prebored holes or mating metal parts embedded therein, which comprises the steps of:
forming a self-boring fastener having an elongated cylindrical element, said cylindrical element having at one end thereof an open axial cavity formed by a continuous circumferential wall member and the opposite end thereof being closed whereby a compression chamber is defined therein;
providing a thin continuous knife-edge element helically positioned about the outer periphery of said cylindrical element;
forming a longitudinally extending knife-edge at the extremity of said open end of said cylindrical element;
providing a driving means formed as an integral part of said element adjacent the closed end of said cylindrical element;
temporarily positioning the materials in contact with each other; and
rotatably embedding the self-boring fastener into and through the first material and into the second material rigidly permanently securing them together;
and compressing the cutout materials against the walls of the axial cavity forming a core of reduced thickness in said chamber.

14. A method as recited in claim 13 wherein the steps include:
creating a compression force within said chamber between the closed end of said cylindrical element and said materials disposed within said chamber.

15. A method as recited in claim 14 wherein the steps include:
forcing said materials disposed in said chamber to expand laterally causing frictional interforce engagement between said materials and the walls of said chamber.

16. A method of fastening wood, rubber or synthetic plastic materials to metallic or metallic hard substrates having prebored holes therein without the use of prebored matching holes in the softer materials or prepositioned mating metal parts embedded in the softer materials, wherein the method comprises the steps of:
forming a self-boring fastener having an elongated cylindrical element, said cylindrical element having at one end an open axial cavity forming a continuous cylindrical wall member and the opposite end thereof being closed whereby a compression chamber is defined therein;
providing a thin continuous knife-edge element helically positioned about the outer periphery of said cylindrical element;
forming a longitudinally extending knife-edge at the extremity of said open end of said cylindrical element;
positioning a driving means adjacent the closed end of said cylindrical element and integrally formed therewith;
temporarily positioning the softer materials against the substrate;
positioning the self-boring fastener into the prebored holes in the substrate, whereby said longitudinally extending knife edge contacts the softer materials;
rotatably embedding said self-boring fastener into said softer material;
compressing a core of said softer material within the axial cavity; and
interconnecting said driving means of said self-boring fastener in rigid attachment to the substrate.

17. The method as recited in claim 16 wherein the steps include:
providing a nut means adjacent said drive means for rigidly securing said softer material to said substrate, whereby said nut means projected outwardly of the holes in said substrate.

18. The method as recited in claim 17 wherein the steps include:
creating a compression force within said chamber between the closed end of said cylindrical element and said material disposed within said chamber.

19. A method as recited in claim 18, wherein the steps include:
forcing said softer material disposed in said chamber to expand laterally and compress axially causing frictional interface engagement between said softer material and the walls of the chamber.

* * * * *